United States Patent
Kashima et al.

(10) Patent No.: US 9,208,227 B2
(45) Date of Patent: *Dec. 8, 2015

(54) ELECTRONIC APPARATUS, REPRODUCTION CONTROL SYSTEM, REPRODUCTION CONTROL METHOD, AND PROGRAM THEREFOR

(71) Applicant: Sony Corporation, Tokyo (JP)

(72) Inventors: Koji Kashima, Kanagawa (JP); Tatsumi Sakaguchi, Kanagawa (JP); Hiroshi Oryoji, Kanagawa (JP); Masashi Eshima, Tokyo (JP)

(73) Assignee: Sony Corporation, Tokyo (JP)

( * ) Notice: Subject to any disclaimer, the term of this patent is extended or adjusted under 35 U.S.C. 154(b) by 252 days.

This patent is subject to a terminal disclaimer.

(21) Appl. No.: 13/798,569

(22) Filed: Mar. 13, 2013

(65) Prior Publication Data

US 2013/0243407 A1    Sep. 19, 2013

Related U.S. Application Data

(63) Continuation of application No. 13/065,537, filed on Mar. 24, 2011, now Pat. No. 8,442,389.

(30) Foreign Application Priority Data

Mar. 31, 2010    (JP) ................................. 2010-084556

(51) Int. Cl.
  *H04N 5/783*    (2006.01)
  *G06F 17/30*    (2006.01)
  (Continued)

(52) U.S. Cl.
  CPC ...... *G06F 17/30799* (2013.01); *G06K 9/00711* (2013.01); *G06K 9/00744* (2013.01);
  (Continued)

(58) Field of Classification Search
  None
  See application file for complete search history.

(56) References Cited

U.S. PATENT DOCUMENTS 7,796,190 B2    9/2010   Basso et al.
8,355,432 B2 *  1/2013   Kobayashi ................... 375/240
(Continued)

FOREIGN PATENT DOCUMENTS

JP    2009-278342    11/2009

OTHER PUBLICATIONS

Understanding Video Events: A Survey of Methods for Automatic Interpretation of Semantic Occurrences in Video, Gal Lavee, Ehud Rivlin, and Michael Rudzsky, IEEE Transactions on Systems, Man, and Cybernetics—Part C: Applications and Reviews, vol. 39, No. 5, Sep. 2009, pp. 1-64.

(Continued)

*Primary Examiner* — Heather Jones
(74) *Attorney, Agent, or Firm* — Sony Corporation

(57) ABSTRACT

Provided is an electronic apparatus including: a storage to store first and second contents, each of which includes scenes, and meta-information items each indicating a feature of each scene of the first and second contents; a reproducer to reproduce the first and second contents; an operation receiver to receive an input of an operation by a user; and a controller to control the storage to store an operation-history information item indicating an operation history of the user for each scene during reproduction of the first content while it is associated with the meta-information item of each scene, to calculate a similarity between scenes of the first and second contents based on the meta-information items, and to control the reproducer to change a reproduction mode for each scene based on the operation-history information item and the similarity during reproduction of the second content.

12 Claims, 5 Drawing Sheets

(51) Int. Cl.
G06K 9/00 (2006.01)
H04N 21/432 (2011.01)
H04N 21/442 (2011.01)
H04N 21/45 (2011.01)
H04N 21/4545 (2011.01)
H04N 21/845 (2011.01)
G11B 27/10 (2006.01)

(52) U.S. Cl.
CPC .......... *G11B27/105* (2013.01); *H04N 21/4325* (2013.01); *H04N 21/44222* (2013.01); *H04N 21/4532* (2013.01); *H04N 21/45457* (2013.01); *H04N 21/8456* (2013.01)

(56) References Cited

U.S. PATENT DOCUMENTS

2008/0044085 A1 2/2008 Yamamoto
2011/0249956 A1* 10/2011 Komai .......................... 386/248

OTHER PUBLICATIONS

Event Mining in Multimedia Streams: Research on identifying and analyzing events and activities in media collections had led to new technologies and systems, Lexing Xie, Hari Sundaram, and Murray Campbell, Proceedings of the IEEE, vol. 96, No. 4, Apr. 2008, I pp. 623-647.

* cited by examiner

FIG.4A

| Positive | | Already-reproduced scene | | Not-yet-reproduced scene A | | Not-yet-reproduced scene B | | Not-yet-reproduced scene C | | Not-yet-reproduced scene D | |
|---|---|---|---|---|---|---|---|---|---|---|---|
| 5W1H | Weighting | Last year's footrace at athletic meet | Matching degree | This year's footrace at athletic meet | Matching degree | This year's march-in at athletic meet | Matching degree | This year's ball playing on bathing beach | Matching degree | This year's congestion on bathing beach | Matching degree |
| Who | 0.3 | Child X, students in gym clothes | 100 | Child X, students in gym clothes | 100 | Students in gym clothes, crowd | 50 | Child X, family of child X, bathing suit | 80 | Bathing suit, crowd | 0 |
| What | 0.2 | Athletic meet, outdoor activity | 100 | Athletic meet, outdoor activity | 100 | Athletic meet, outdoor activity | 100 | Bathing, outdoor activity | 50 | Bathing, outdoor activity | 50 |
| When | 0.1 | Autumn, daytime | 100 | Autumn, daytime | 100 | Autumn, daytime | 100 | Summer, daytime | 50 | Summer, daytime | 50 |
| Where | 0.15 | School, outdoors, athletic field | 100 | School, outdoors, athletic field | 100 | School, outdoors, athletic field | 100 | Beach, outdoors | 50 | Beach, outdoors | 50 |
| Why | 0.05 | School events | 100 | School events | 100 | School events | 100 | Family vacation | 0 | Family vacation | 0 |
| How | 0.2 | Running, competing | 100 | Running, competing, moving | 100 | Walking | 0 | Ball playing, moving | 80 | Lying, sitting | 10 |
| Reproduction priority P = Σ (Weighting * Matching degree) | | | | | 100 | | 65 | | 62.5 | | 24.5 |

FIG.4B

| Negative | | Already-reproduced scene | | Not-yet-reproduced scene A | | Not-yet-reproduced scene B | | Not-yet-reproduced scene C | | Not-yet-reproduced scene D | |
|---|---|---|---|---|---|---|---|---|---|---|---|
| 5W1H | Weighting | Last year's march-in at athletic meet | Matching degree | This year's footrace at athletic meet | Matching degree | This year's march-in at athletic meet | Matching degree | This year's ball playing on bathing beach | Matching degree | This year's congestion on bathing beach | Matching degree |
| Who | -0.3 | Students in gym clothes, crowd | 100 | Child X, students in gym clothes | 50 | Students in gym clothes, crowd | 100 | Child X, family of child X, bathing suit | 0 | Bathing suit, crowd | 50 |
| What | -0.2 | Athletic meet, outdoor activity | 100 | Athletic meet, outdoor activity | 100 | Athletic meet, outdoor activity | 100 | Bathing, outdoor activity | 50 | Bathing, outdoor activity | 50 |
| When | -0.1 | Autumn, daytime | 100 | Autumn, daytime | 100 | Autumn, daytime | 100 | Summer, daytime | 50 | Summer, daytime | 50 |
| Where | -0.15 | School, outdoors, athletic field | 100 | School, outdoors, athletic field | 100 | School, outdoors, athletic field | 100 | Beach, outdoors | 50 | Beach, outdoors | 50 |
| Why | -0.05 | School events | 100 | School events | 100 | School events | 100 | Family vacation | 0 | Family vacation | 0 |
| How | -0.2 | Walking | 100 | Running, competing, moving | 0 | Walking | 100 | Ball playing, moving | 10 | Lying, sitting | 10 |
| Reproduction priority N = Σ (Weighting * Matching degree) | | | | | -65 | | -100 | | -24.5 | | -39.5 |

FIG.4C

| | Not-yet-reproduced scene A | Not-yet-reproduced scene B | Not-yet-reproduced scene C | Not-yet-reproduced scene D |
|---|---|---|---|---|
| Overall reproduction priority T = P+N | 35 | -35 | 38 | -15 |
| | High priority | | High priority | |

ELECTRONIC APPARATUS, REPRODUCTION CONTROL SYSTEM, REPRODUCTION CONTROL METHOD, AND PROGRAM THEREFOR

CROSS-REFERENCE TO RELATED APPLICATION

The present application is a continuation of U.S. patent application Ser. No. 13/065,537, filed on Mar. 24, 2011, which claims priority from Japanese Patent Application No. JP 2010-084556 filed in the Japanese Patent Office on Mar. 31, 2010, all of which are incorporated herein by reference.

BACKGROUND OF THE INVENTION

1. Field of the Invention

The present invention relates to an electronic apparatus capable of reproducing contents such as videos, to a reproduction control system using the electronic apparatus, and to a reproduction control method and a program in the electronic apparatus.

2. Description of the Related Art

In some cases, in order to view, in a more joyful way, contents such as videos and still images, which are shot by a digital video camera and a digital still camera, respectively, a user perform editing works including selecting scenes, correcting image quality, adding visual effect, and the like, depending on his or her preference. However, the above-mentioned editing works are very cumbersome particularly for users who are not used to the editing works. Actually, there are few users who are willing to spend time performing the above-mentioned editing works. In many cases, contents are left untouched after shooting. In addition, there are many contents that are never viewed.

As one of methods of controlling a reproduction mode of each content depending on a preference of a user, a method using a reproduction history (viewing history) of each content can be conceived. For example, Japanese Patent Application Laid-open No. 2009-278342 (hereinafter, referred to as Patent Document 1) discloses the following technique. Specifically, in the technique, in a case where there are a first video content and a second video content as a sequel of the first video content, the first video content includes a preview of the second video content, and the second video content includes a previous story line of the first video content, the reproduction of the previous story line is omitted during reproduction of the second video content if it is determined that the first video content has been reproduced before the reproduction of the second video content. On the other hand, the reproduction of the preview is omitted during reproduction of the first video content if it is determined that the second video content has been reproduced before the reproduction of the first video content.

SUMMARY OF THE INVENTION

However, the technique described in Patent Document 1 depends on the assumption that the first video content and the second video content are video contents in series, and hence it may be impossible to apply the above-mentioned technique in a case where a relation between contents is unknown, for example, in a case of viewing video contents shot by a user.

Further, the technique described in Patent Document 1 is one that controls whether or not to reproduce only sub-contents separate from a main story, such as the preview and the previous story line. Therefore, it may be impossible to determine a preference of a user for each of scenes of a video content, to thereby control the reproduction mode.

In view of the circumstances as described above, there is a need for providing an electronic apparatus capable of changing a reproduction mode for each of scenes of a content depending on a preference of a user, a reproduction control system using the electronic apparatus, and a reproduction control method and a program in the electronic apparatus.

According to an embodiment of the present invention, there is provided an electronic apparatus including a storage, a reproducer, an operation receiver, and a controller. The storage stores a first content and a second content, each of which includes a plurality of scenes, and meta-information items each indicating a feature of each of the plurality of scenes of the first content and the second content. The reproducer reproduces the first content and the second content. The operation receiver receives an input of an operation by a user. The controller controls the storage to store an operation-history information item indicating an operation history of the user for each of the plurality of scenes during reproduction of the first content while the operation-history information item is associated with the meta-information item of each of the plurality of scenes. Further, the controller calculates a similarity between each of the plurality of scenes of the first content and each of the plurality of scenes of the second content based on the meta-information items, and controls the reproducer to change a reproduction mode for each of the plurality of scenes based on the operation-history information item and the calculated similarity during reproduction of the second content.

With this configuration, the electronic apparatus is capable of changing, based on the similarity between the first content and the second content and the operation-history information item for each of the scenes of the first content, the reproduction mode of the second content for each of the scenes. Thus, the electronic apparatus is capable of reproducing a content in a mode reflecting a preference of a user for each of the scenes without causing the user to perform cumbersome editing works. Here, the operation-history information item means, for example, information items about a specific reproduction operation, for example, a fast-forward operation, a fast-rewind operation, a play in slow motion, and skip and play. The change of the reproduction mode means performing a play in slow motion, a skip play, various effect processes, and the like in place of performing a normal reproduction processes, for example.

The electronic apparatus may further includes a sensor configured to detect a viewing-state-history information item indicating a viewing-state-history of the user for each of the plurality of scenes during reproduction of the first content. In this case, the controller may control the storage to store the viewing-state-history information item together with the operation-history information item while the viewing-state-history information item is associated with the meta-information item of the each of the plurality of scenes. Further, the controller may control the reproducer to change the reproduction mode for each of the plurality of scenes of based on the operation-history information item, the viewing-state-history information item, and the similarity during reproduction of the second content.

With this, the electronic apparatus considers not only the operation-history information item, but also the viewing-state-history information item. Thus, the electronic apparatus is capable of determining a preference of a user for each of the scenes with high accuracy, to thereby reflect the preference of the user in the change of the reproduction mode. Here, the viewing-state-history information item means, for example, the number of viewing users, the names of users, facial expressions of a user (emotions), whether or not eyes are directed to a content and the direction of eyes, behaviors, laughing, comments, and excited state of a user. The sensor is, for example, a camera, a microphone, a human sensor, or a biometric sensor.

The controller may calculate a preference degree indicating a preference of the user with respect to each of the plurality of scenes of the first content based on the operation-history information item and the viewing-state-history information item and may calculate a priority of each of the plurality of scenes of the second content based on the calculated preference degree and the calculated similarity. Further, the controller may control the reproducer to preferentially reproduce a scene having a high priority calculated by the controller.

With this, the electronic apparatus is capable of suitably determining a preference with respect to each of the scenes of the first video content based on the operation-history information item and the viewing-state-history information item, to thereby preferentially reproduce a scene of the second content, which is similar to a scene of the first content, which is determined as one for which the user has a positive preference.

The storage may store different kinds of meta-information items for each of the plurality of scenes. In this case, the controller may calculate the preference degree for each of the meta-information items of each of the plurality of scenes of the first video content, and may calculate the priority of each of the plurality of scenes by summing up values obtained by multiplying the preference degree by the similarity for each of the plurality of scenes.

With this, the electronic apparatus calculates a second priority based on the different meta-information items, and hence the electronic apparatus is capable of controlling the reproduction of the second content while more precisely reflecting a preference of a user.

The electronic apparatus may further include a communication unit configured to communicate with a different electronic apparatus. In this case, the controller may generate a control signal for changing the reproduction mode of the second content for each of the plurality of scenes. Further, the controller may control the communication unit to transmit the stored second content to the different electronic apparatus together with the control signal.

With this, the electronic apparatus transmits the second content to the different electronic apparatus together with the control signal. Thus, the electronic apparatus is capable of reproducing the second content in the different electronic apparatus while the reproduction mode of the second content is changed for each of the scenes depending on a preference of a user. That is, the electronic apparatus is capable of automatizing works in which the user of the electronic apparatus edits the content depending on the preference of the user, and transmits the content to the user of the different electronic apparatus.

The communication unit may receive, from the different electronic apparatus, the operation-history information item and the viewing-state-history information item, which are stored in the different electronic apparatus. In this case, the controller may generate the control signal based on the received operation-history information item, the received viewing-state-history information item, and the calculated similarity.

With this, the electronic apparatus is capable of reproducing the second content in the different electronic apparatus while the reproduction mode of the second content is changed depending on a preference of a user of the different electronic apparatus. Further, the electronic apparatus is capable of receiving the operation-history information item and the viewing-state-history information item with respect to the second content of the different electronic apparatus, to thereby grasp the reaction of the user of the different electronic apparatus with respect to the change of the reproduction mode of the second content. Further, in view of this reaction, the electronic apparatus is also capable of generating and transmitting a new control signal so as to more precisely correspond to the preference of the user of the different electronic apparatus.

According to another embodiment of the present invention, there is provided a reproduction control system including a first electronic apparatus and a second electronic apparatus. The first electronic apparatus includes a generator, an extractor, and a transmitter. The generator generates a first content and a second content, each of which includes a plurality of scenes. The extractor extracts, from each of the plurality of scenes of the generated first content and the generated second content, a meta-information item indicating a feature of each of the plurality of scenes. The transmitter transmits the first content and the second content together with the meta-information items. The second electronic apparatus includes a receiver, a storage, a reproducer, an operation receiver, and a controller. The receiver receives the transmitted first content, the transmitted second content, and the transmitted meta-information items. The storage stores the received first content, the received second content, and the received meta-information items. The reproducer reproduces the first content and the second content. The operation receiver receives an input of an operation by a user. The controller controls the storage to store an operation-history information item indicating an operation history of the user for each of the plurality of scenes during reproduction of the first content while the operation-history information item is associated with the meta-information item of each of the plurality of scenes. Further, the controller calculates a similarity between each of the plurality of scenes of the first content and each of the plurality of scenes of the second content based on the meta-information items, and controls the reproducer to change a reproduction mode for each of the plurality of scenes based on the operation-history information item and the calculated similarity during reproduction of the second content.

According to still another embodiment of the present invention, there is provided a reproduction control method including storing a first content and a second content, each of which includes a plurality of scenes, and meta-information items each indicating a feature of each of the plurality of scenes of the first content and the second content. The first content and the second content are reproduced. The operation-history information item indicating an operation history of the user for each of the plurality of scenes during reproduction of the first content is stored while the operation-history information item is associated with the meta-information item of each of the plurality of scenes. The similarity between each of the plurality of scenes of the first content and each of the plurality of scenes of the second content is calculated based on the meta-information items. Further, a reproduction mode is changed for each of the plurality of scenes based on the operation-history information item and the calculated similarity during reproduction of the second content.

According to still another embodiment of the present invention, there is provided a program to cause an electronic apparatus to execute a first storing step, a reproducing step, a second storing step, a calculating step, and a changing step. In the first storing step, a first content and a second content, each of which includes a plurality of scenes, and meta-information items each indicating a feature of each of the plurality of scenes of the first content and the second content are stored. In the reproducing step, the first content and the second content are reproduced. In the second storing step, an operation-history information item indicating an operation history of the user for each of the plurality of scenes during reproduction of the first content is stored while the operation-history information item is associated with the meta-information item of each of the plurality of scenes. In the calculating step, a similarity between each of the plurality of scenes of the first content and each of the plurality of scenes of the second content is calculated based on the meta-information items. In the changing step, a reproduction mode is changed for each of the plurality of scenes based on the operation-history information item and the calculated similarity during reproduction of the second content.

As described above, according to the embodiments of the present invention, it is possible to change a reproduction mode for each of scenes of a content depending on a preference of a user.

These and other objects, features and advantages of the present invention will become more apparent in light of the following detailed description of best mode embodiments thereof, as illustrated in the accompanying drawings.

BRIEF DESCRIPTION OF DRAWINGS

FIGS. 4A, 4B and 4C are views each showing a method of calculating a reproduction priority of each of the scenes in the embodiment of the present invention.

DESCRIPTION OF PREFERRED EMBODIMENTS

Hereinafter, embodiments of the present invention will be described with reference to the drawings.
[Hardware Configuration of TV]

Figure 1:
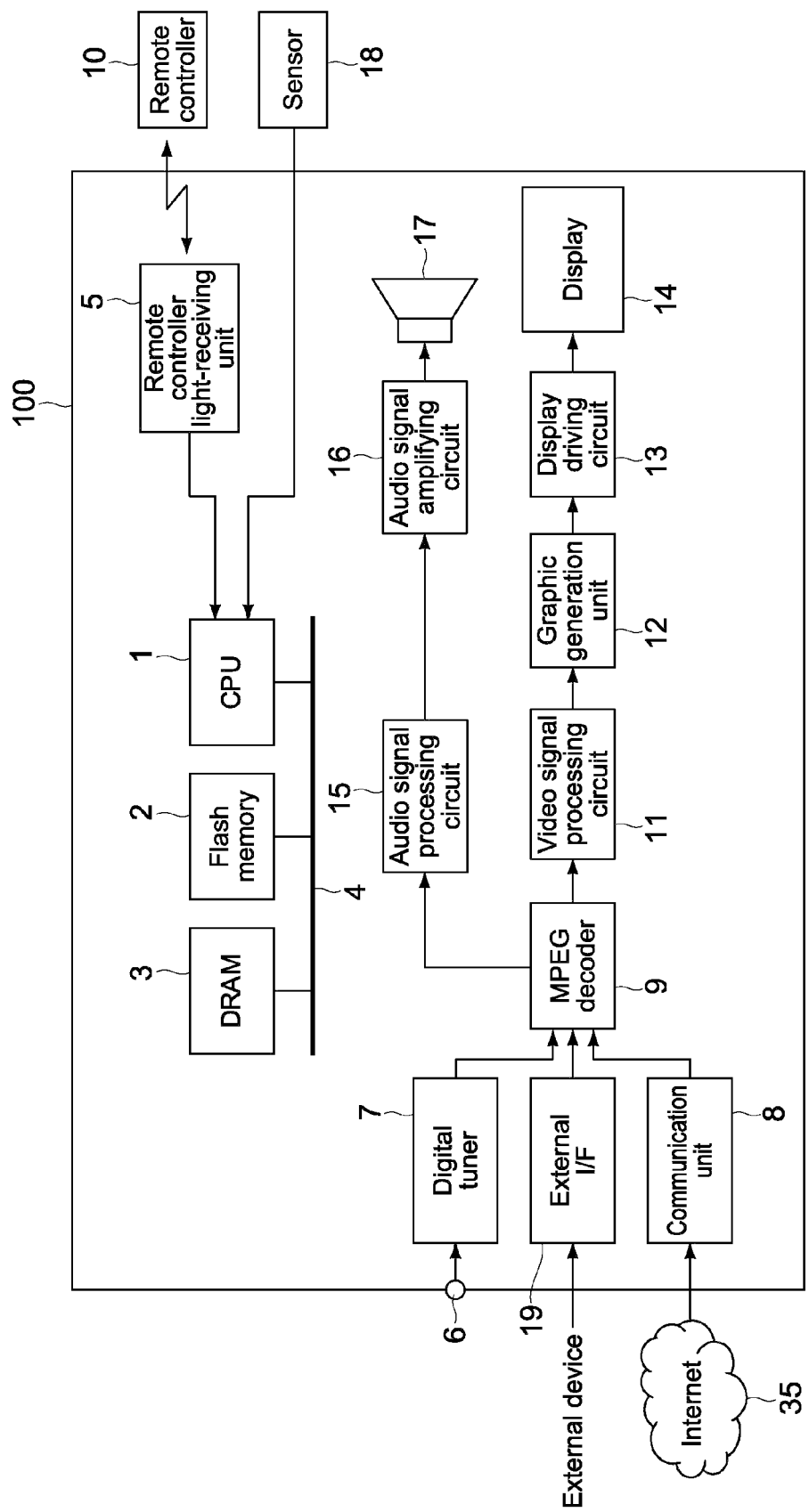
FIG. 1 is a block diagram showing a hard configuration of a TV according to an embodiment of the present invention.

FIG. 1 is a block diagram showing a hardware configuration of a television set according to an embodiment of the present invention.

As shown in FIG. 1, a television set 100 (hereinafter, referred to as TV 100) includes a CPU 1, a flash memory 2, a dynamic RAM (DRAM) 3, an internal bus 4, a remote controller light-receiving unit 5, a digital antenna input terminal 6, a digital tuner 7, a communication unit 8, an MPEG decoder 9, a video signal processing circuit 11, a graphic generation unit 12, a display driving circuit 13, a display 14, an audio signal processing circuit 15, an audio signal amplifying circuit 16, a speaker 17, a sensor 18, and an external interface (I/F) 19.

The digital antenna input terminal 6 inputs a broadcast signal of digital broadcasting received through a digital antenna (not shown). The digital tuner 7 selects a signal of a channel specified through the broadcast signal, and outputs the signal to the MPEG decoder 9. The communication unit 8 includes, for example, an NIC, and performs a communication process between the TV 100 and a different device via an Internet 35.

The MPEG decoder 9 decodes the broadcast signal encoded in MPEG specification, a content signal of a video or a still image input by an external device, and a content signal received through the communication unit 8. Then, the MPEG decoder 9 outputs, among the decoded signals, a video signal to the video signal processing circuit 11, and an audio signal to the audio signal processing circuit 15.

The video signal processing circuit 11 subjects the input video signal to a necessary image process, and outputs the processed video signal to the graphic generation unit 12. The graphic generation unit 12 synthesizes the input video signal and a graphical user interface (GUI) screen and the like by an On-screen display (OSD) process. Then, the video signal processing circuit 11 outputs the synthesized one. For example, the display driving circuit 13 digital/analog-converts the video signal supplied from the graphic generation unit 12, and drives the display 14 according to the analog video signals. The display 14 includes, for example, a crystal display, a plasma display panel (PDP), and an EL display, and displays the analog video signal input from the display driving circuit 13.

The audio signal processing circuit 15 subjects the input audio signal to a necessary audio processing, and then, outputs the processed audio signal to the audio signal amplifying circuit 16. The audio signal amplifying circuit 16 controls the input audio signal to have a necessary volume, and outputs the controlled audio signal to the speaker 17 so as to reproduce it.

The CPU 1 accesses the DRAM 3 and the like if necessary so as to generally control the respective blocks of the TV 100.

The flash memory 2 is a nonvolatile memory in which, in addition to an OS to be executed by the CPU 12, firmware including programs of various applications, various parameters, and the like are stably stored. In particular in this embodiment, the TV 100 is capable of controlling a reproduction mode of each of scenes of a content depending on a viewing history of the user of the content as will be described later. The flash memory 2 stores also a reproduction control application for the above-mentioned control of reproduction.

The DRAM 3 is used as a working area for the CPU 1. The DRAM 3 is a memory for temporarily holding the OS, the programs, processed data, and the like.

The CPU 1, the flash memory 2, and the DRAM 3 are connected to the internal bus 4, and the CPU 1, the flash memory 2, and the DRAM 3 are accessible to each other. In this manner, the TV 100 is generally controlled.

The remote controller light-receiving unit 5 receives user's operation in a remote-control signal form from a remote controller 10, and outputs the remote-control signal to the CPU 1. With this, control processes of the TV 100, which include receiving or reproducing a content and the like according to user's operation, are executed. The remote controller 10 includes, for example, various operation portions including numeral keys respectively corresponding to broadcast channels, a menu button, a play button, a pause button, a fast-forward button, a fast-rewind button, and the like.

The sensor 18 is, for example, a camera, a microphone, a human sensor, or a biometric sensor, and detects a viewing state of a user during reproduction of a content. The viewing state includes, for example, the number of viewing users, the names of users, facial expressions of a user (emotions), whether or not eyes are directed to a content and the direction of view, behaviors, laughing, comments, and excited state of a user. The sensor 18 is installed at a position appropriate for obtaining some information from a user, for example, at an upper front part or a lower front part of the TV 100.

For example, complying with a communication specification of high-definition multimedia interface (HDMI) or universal serial bus (USB), the external I/F 19 inputs a content signal, for example, from a shooting apparatus such as a digital still camera or a digital video camera, or a different external device.

[Software Configuration of TV]

Figure 2:
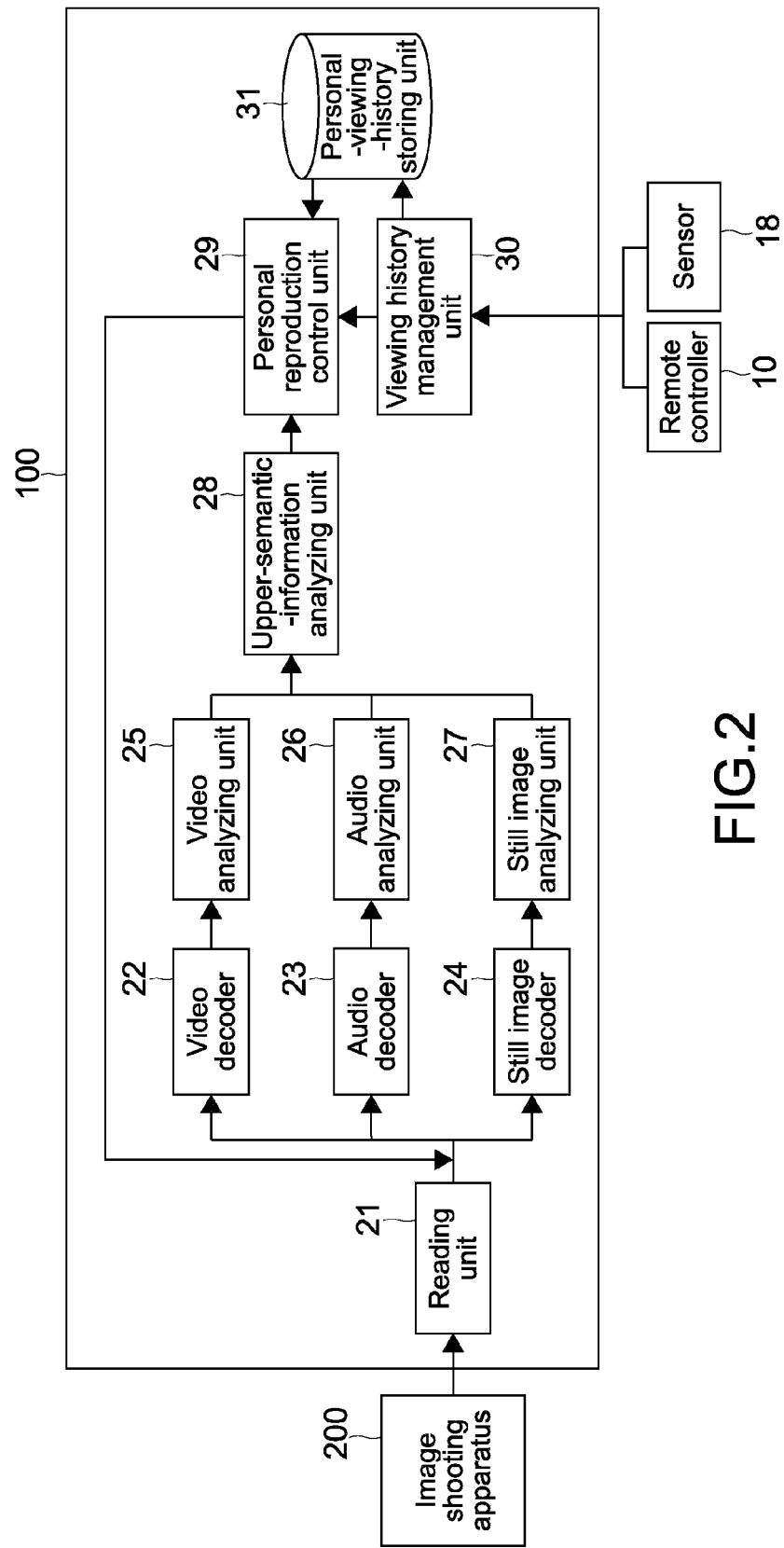
FIG. 2 is a block diagram showing functional blocks included in a reproduction control application for control of reproduction of a content in the embodiment of the present invention.

As described above, the TV 100 is capable of controlling the reproduction mode of the content depending on the viewing history of the user through the reproduction control application. FIG. 2 is a block diagram showing functional blocks included in the reproduction control application for control of reproduction of a content in the TV 100.

As shown in FIG. 2, the TV 100 includes a reading unit 21, a video decoder 22, an audio decoder 23, a still image decoder 24, a video analyzing unit 25, an audio analyzing unit 26, a still image analyzing unit 27, an upper-semantic-information analyzing unit 28, a personal reproduction control unit 29, a viewing history management unit 30, and a personal-viewing-history storing unit 31.

The reading unit 21 reads, from a shooting apparatus 200 such as a digital still camera or a digital video camera, video contents and still image data items. The still image data items are read for each of groups corresponding to a date, a time band, and the like. In a case where read data is a video content, the reading unit 21 divides the video content into a video data item and an audio data item. Then, the reading unit 21 outputs the video data item to the video decoder 22, and the audio data item to the audio decoder 23. Otherwise, the reading unit 21 outputs a still image data item to the still image decoder 24.

The video decoder 22 decodes the above-mentioned video data item, and outputs the decoded video data item to the video analyzing unit 25. The audio decoder 23 decodes the above-mentioned audio data item, and outputs the decoded audio data item to the audio analyzing unit 26. The still image decoder 24 decodes the above-mentioned still image data item, and outputs the decoded still image data item to the still image analyzing unit 27.

The video analyzing unit 25 extracts, from the video data item, objective feature information items, and extracts, based on the feature information items, lower meta-information (semantic information) items. Similarly, the audio analyzing unit 26 and the still image analyzing unit 27 extract, from the audio data item and the still image data item, objective feature information items, and extract, based on the feature information items, lower meta-information items, respectively. For the above-mentioned extraction of the lower meta-information items, there is also used a technique described in Understanding Video Events: A Survey of Methods for Automatic Interpretation of Semantic Occurrences in Video, Gal Lavee, Ehud Rivlin, and Michael Rudzsky, IEEE TRANSACTIONS ON SYSTEMS, MAN, AND CYBERNETICS-PART C: APPLICATIONS AND REVIEWS, VOL. 39, NO. 5, September 2009.

The video analyzing unit 25 executes, in the extraction of the feature information items, for example, image-based processes such as color/texture feature extraction, gradient calculation, edge extraction, and object-based processes such as detection/recognition of people/faces, recognition of objects, motion detection/speed detection Of people/faces/objects. In the detection of people, the video analyzing unit 25 uses, for example, feature filters indicating people shapes to detect area including a person (people) from a video. In the face detection, the video analyzing unit 25 uses, for example, feature filters showing features of positional relations between eyes, nose, eyebrows, cheeks, and the like, a skin information, or the like, to detect area including face(s) from a video.

In addition, the video analyzing unit 25 is capable of recognizing not only the presence and absence of people or faces, but also a specified person. For example, an edge intensity image feature, a frequency intensity image feature, a high-order autocorrelation feature, and a color-converted image feature can be used for the recognition of the specified person. For example, in a case of using the edge intensity image feature, the video analyzing unit 25 stores, as feature data items of people being targets to be recognized (for example, parents, children, a partner, and friends who are associated with a user), gray images, and edge intensity images. Then, the video analyzing unit 25 extracts, from a face image of a person whose face is detected, an gray image and an edge intensity image as described above, and performs pattern matching on both gray images and both edge intensity images, to thereby recognize the face of the specified person.

Further, in the object recognition, the video analyzing unit 25 uses recognition models stored as the above-mentioned event feature information items to determine whether or not an object being a target to be identified is included in the video. The recognition models are constructed in advance from images for leaning by mechanical learning such as support vector machines (SVM).

In addition, the video analyzing unit 25 is capable of recognizing backgrounds in addition to people and objects in the videos. For example, the video analyzing unit 25 uses models, which are constructed in advance from images for learning by the mechanical learning such as the SVM, to classify backgrounds in the videos into scenes including city, indoors, outdoors, seacoast, in water, night scene, sunset, snow scene, and crowded scene, for example.

Here, in a case where the video content includes a plurality of scenes, the video analyzing unit 25 detects a visual feature such as a cut or a fade from the video content, and classifies the video content into the plurality of scenes before the lower meta-information items are extracted.

In the extraction of the feature information items, the audio analyzing unit 26 detects, from the audio data items, human voices, environmental sound other than the human voices, and features in intensity/tone of those sounds, for example. In order to identify the human voice and the environmental sound, duration time of an audio having intensity equal to or higher than a predetermined value is used, for example.

In the extraction of the feature information items, the still image analyzing unit 27 executes, among analysis processes which can be executed by the video analyzing unit 25, static processes including color/texture feature extraction, gradient calculation, edge extraction, people/face/object detection, recognition of background.

Further, in a case where data items include tag (label) information items of text and the like, the analyzing units 25 to 27 also extract the tag information items thereof as the feature information items. The tag information items include, for example, information items indicating event contents and information items of shooting date and time, shooting location, and the like.

The analyzing units 25 to 27 extract, based on the extracted feature information items, lower meta-information (semantic information) items to which more specific meanings are added.

For example, the video analyzing unit 25 identifies, based on the extracted people features and face features, individuals, sex, age, facial expression, position, clothing, the number of people, and arrangement as the lower meta-information items. Further, the video analyzing unit 25 recognizes, based on the motion features, Activity including active/inactive activity, speedy/slow activity, standing/sitting/walking/running, and the like, and recognizes gesture of hands and the like.

The audio analyzing unit 26 extracts, for example, from the extracted audio features, clapping, cheer, speaker sounds, feelings corresponding to voices, laughing, screaming, spoken contents, the size of space according to reflection as the lower meta-information items.

The still image analyzing unit 27 recognizes, among meta-information items which can be recognized by the video analyzing unit 25, meta-information items which is not associated with the motion features.

For the extraction of the lower meta-information items, there can be used various methods including, for example, methods by state space representation such as Bayesian network, finite state machine, conditional random field (CRF), and hidden Markov model (HMM), methods by discrete event system such as Petri Net, constraint satisfaction model, and semantic model such as logic approach, pattern recognition/classification in the related art such as SVM, nearest neighbor method, neural network.

The upper-semantic-information analyzing unit 28 analyzes, based on the lower meta-information items extracted by the analyzing units 25 to 27, upper meta-information items. Then, the upper-semantic-information analyzing unit 28 derives the most upper meta-information item capable of globally describing one shot of a video or one group of still images, that is, event. For this event deriving process, there is also used a technique described in Event Mining in Multimedia Streams: Research on identifying and analyzing events and activities in media collections had led to new technologies and systems, Lexing Xie, Hari Sundaram, and Murray Campbell, Proceedings of the IEEE | Vol. 96, No. 4, April 2008.

Specifically, the upper-semantic-information analyzing unit 28 gradually increases the level of abstraction of a plurality of information items corresponding to 5W1H (Who, What, When, Where, Why, How) from the lower meta-information items, and finally categorizes each of the scenes as one event.

For example, in a case where from a video or a still image, meta-information items regarding people such as "a number of children," "a number of parents and children," and "gym clothes," meta-information items regarding motion of people such as "active motion" and "running," meta-information items regarding normal objects such as "school buildings" are extracted, meta-information items of "human voice through a speaker," "clapping," "cheer," and the like are extracted from an audio, and information items including a positional information item of "elementary school," a season (date and time) information item of "autumn," and the like are obtained as other meta-information items, the upper-semantic-information analyzing unit 28 combines those information items and then arrives at an event of "athletic meet at elementary school." In addition, in a case where a meta-information item regarding a user or his or her family is also extracted, the upper-semantic-information analyzing unit 28 is capable of more specifically determining the above-mentioned event as "athletic meet at elementary school of child X."

After the upper-semantic-information analyzing unit derives the events of the scenes with respect to each content, the personal reproduction control unit 29 controls, when the user provides an instruction for reproducing a content, to change a reproduction mode of the content for each of the scenes included in the content. The change of the reproduction mode includes processes including selection of scenes to be reproduced, selection of reproduction method, and the like.

The viewing history management unit 30 stores viewing history information items of contents of a user regarding the TV 100 in the personal-viewing-history storing unit 31, while the viewing history information items are associated with each of the events of the scenes, which are derived by the upper-semantic-information analyzing unit 28, and with the meta-information items used for deriving the events of the scenes. Further, the viewing history management unit 30 manages the stored viewing history information items. Here, the viewing history information items include operation-history information items and viewing-state-history information items. The operation-history information items mean, for example, information items about specific reproduction operations performed by a user through the remote controller 10 during reproduction of each content, for example, a fast-forward operation, a fast-rewind operation, a play in slow motion, and skip and play. The viewing-state-history information items mean, for example, information items about the number of viewing users, the names of users, facial expressions of a user (emotions), whether or not eyes are directed to a content and the direction of view, behaviors, laughing, comments, excited state of a user, which are detected by the sensor 18 during reproduction of each content. In a case where the names of users are specified during reproduction of a content, the viewing history information items are stored for each of the users. The above-mentioned meta-information items are classified into elements respectively corresponding 5W1H, for example, and are stored.

The personal reproduction control unit 29 analyzes a preference of a user with respect to each of scenes of contents reproduced in the past from the events and the meta-information items based on the viewing history information items managed by the viewing history management unit 30, and changes the reproduction mode of each of scenes of a content being a target to be reproduced so that that scene matches a preference of the user.

[Operation of TV]

Figure 3:
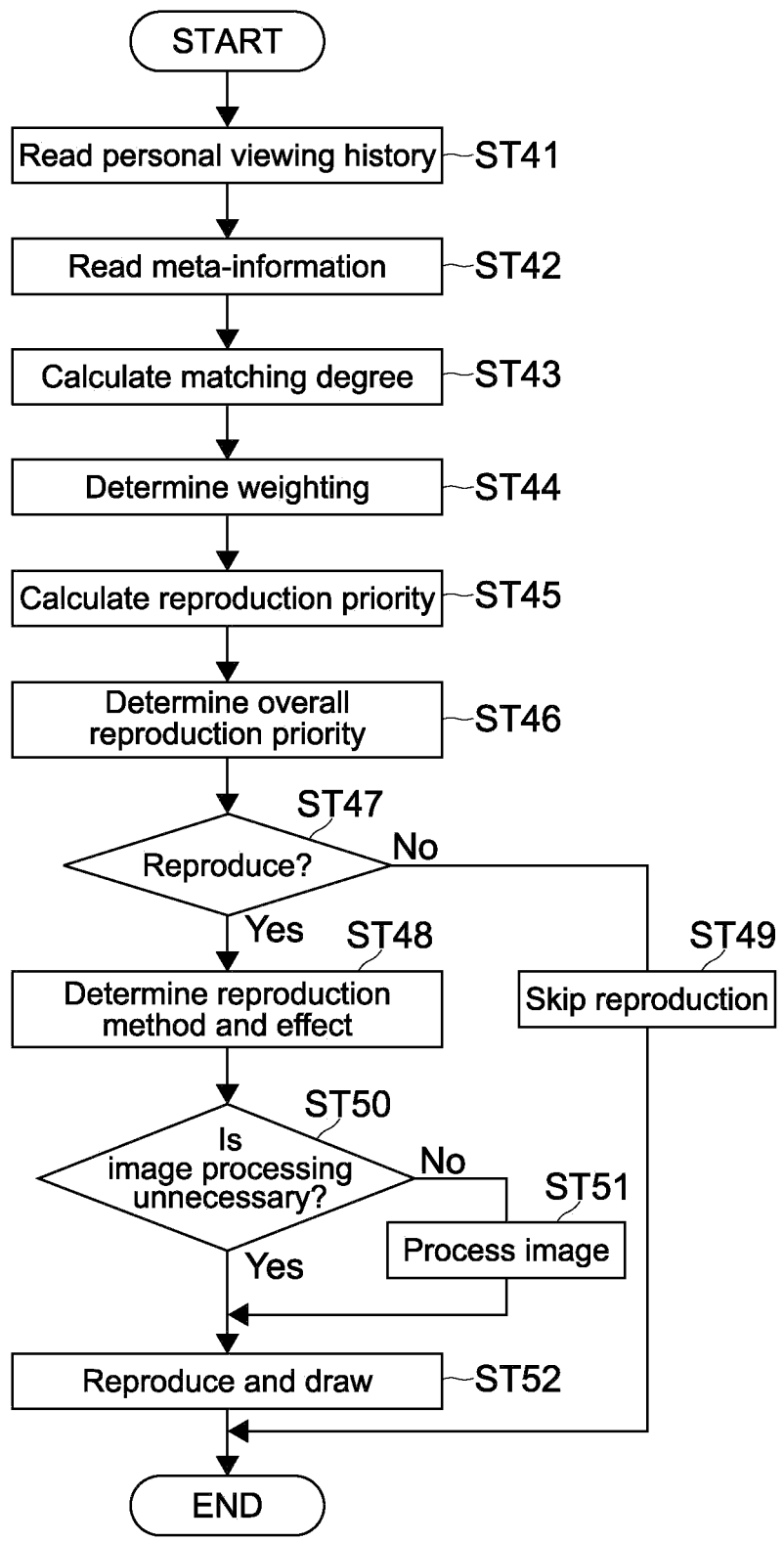
FIG. 3 is a flow chart showing a flow of a reproduction control process by the TV according to the embodiment of the present invention.

Next, the description will be made of a reproduction control operation of the TV 100 thus configured. In the following, although the reproduction control operation of the TV 100 will be described while considering the CPU 1 of the TV 100 as a main operating subject, the operation is executed also in cooperation with other hardware and other software such as the reproduction control application. FIG. 3 is a flow chart showing a flow of a reproduction control process by the TV 100.

When an instruction for reproducing a certain content is provided from a user, the CPU 1 reads, first, the viewing history information items stored in the personal-viewing-history storing unit 31 (Step 41). When the CPU 1 can specify the user, who has provided the instruction for reproduction, through the sensor 18, the CPU 1 reads the viewing history information items associated with the specified user.

Subsequently, the CPU 1 reads meta-information items associated with the viewing history information items (Step 42). Then, the CPU 1 determines a reproduction method for each of scenes of the content being the target to be reproduced based on the read viewing history information items and the read meta-information items. The determination of the reproduction method is performed according to a reproduction priority calculated with respect to each of the scenes. FIG. 4 are views each showing the method of calculating the reproduction priority of each of the scenes. In the following, with reference to FIG. 3 and FIG. 4, a process of calculating the reproduction priority will be described.

First, the CPU 1 calculates matching degrees (similarities) between the read viewing history information items and the meta-information items for the respective elements of 5W1H (Step 43).

Here, before the matching degrees are calculated, the CPU 1 classifies each of the scenes into a scene liked by the user or a scene not liked by the user, that is, Positive scene for the user or Negative scene for the user based on the viewing history information items of each of the scenes. Further, the CPU 1 manages the meta-information items in 5W1H for each of the classified Positive/Negative scenes.

For example, in a case where an operation-history information item indicating that a certain scene of a content viewed by a user has been rewound and replayed many times and played in slow motion is stored as one of the viewing history information items, the above-mentioned scene is classified into Positive scene interested by the user. On the other hand, in a case where an operation-history information item indicating that a certain scene of a content viewed by a user has been fast-forwarded and skipped is stored as one of the viewing history information items, the above-mentioned scene is classified into Negative scene not interested by the user.

Further, as the viewing history information items, not only the operation-history information item, but also the viewing-state-history information item of each of the scenes are referred to. For example, in a case where the smiling face of a user is detected during reproduction of a certain scene, that scene is classified into Positive scene. On the other hand, in a case where the sad face or the angry face of a user is detected during a certain scene, or in a case where the eyes of a user are not directed to the TV 100 (the user does not watch that scene), the above-mentioned scene is classified into Negative scenes. Further, for example, in a case where although the operation-history information item indicating that a certain scene has been rewound and replayed many times is stored, a user has not watched the above-mentioned scene, or the sad face of the user is detected during reproduction of the above-mentioned scene, that scene is classified into Negative scene.

For the classification process of Positive/Negative scenes, not only the uniformed method as described above, but also a method using learning may be used. Further, a scene, which is difficult to be classified into Positive scene or Negative scene, may be classified into Neutral scene.

In the example of FIG. 4, for example, in an already-reproduced video content, as shown in FIG. 4A, a scene (event) of "Last year's footrace at athletic meet" is classified into Positive scene, and as shown in FIG. 4B, a scene (event) of "Last year's march-in at athletic meet" is classified into Negative scene. Each of the scenes includes meta-information items classified in the elements of 5W1H. The meta-information items are text information items indicating 5W1H of each of the scenes, for example. From one scene (event), at least one or more text information items are extracted for at least one of the elements.

The CPU 1 compares the most upper meta-information items corresponding to 5W1H of the scenes classified in Positive scenes and the scenes classified in Negative scenes to upper meta-information items corresponding to 5W1H of scenes (scenes A to D) of not-yet-reproduced contents, to thereby calculate matching degrees therebetween.

In this case, each of the matching degrees is calculated, for example, by using a formula: "the number of meta-information items matching between the scene in the viewing history and each of the scenes being a target to be reproduced/the number of meta-information items of the scene in the viewing history," for each of the elements of 5W1H. However, the present invention is not limited to thereto. For example, the CPU 1 may use thesaurus, to thereby calculate the matching degree between words or texts as the meta-information items.

Subsequently, the CPU 1 determines a weighting to be multiplied on each of the calculated matching degrees (Step 44). Although in this embodiment, the weighting is fixed, the weighting may be customized by a user, or may be updated by mechanical learning if necessary. The weighting is set to a positive value for Positive scene, or to a negative value for Negative scene. Although the fixed weightings with respect to each of the elements of 5W1H are, for example, assigned in such a manner that the fixed weightings increase in an order of Who>What=How>When>Where>Why, the present invention is not limited to thereto. Further, it is also possible to set a weighing, which was added a long time ago, to be smaller than a weighing, which was recently added, so that an effect of the weighing, which was added a long time ago, is suppressed. That setting is based on a consideration that a preference of a user is changed over time as the user views the same content many times.

Further, in place of or in addition to the most upper meta-information items corresponding to 5W1H, it is also possible to compare the lowest meta-information items or middle meta-information items to each other. In this case, although also with respect to the lowest meta-information items or the middle meta-information items, the above-mentioned weightings are assigned, the most lower meta-information items are set to be smaller than the weightings added to the most upper meta-information items, to thereby suppress the effect of those weightings.

The CPU 1 multiplies weightings, which are respectively assigned to the elements, by the matching degrees of the elements and the weighted matching degrees are added together (Σ(weighting×matching degree)), to thereby calculate reproduction priorities P and N for each of classified Positive scenes and Negative scenes (Step 45). At this time, the CPU 1 may not multiply weightings to the matching degrees of the elements and the weighted matching degrees may not be added together, and, for example, in a case where the elements of Who and How or the elements of Who and What are both matched or not matched, the CPU 1 may separately add or subtract its reproduction priority.

Then, as shown in FIG. 4C, the CPU 1 sums up reproduction priorities of classified Positive scenes and Negative scenes corresponding to each other, to thereby calculate overall reproduction priorities T(P+N) (Step 46). In the example of FIG. 4, for example, a not-yet-reproduced scene A (event of "This year's footrace at athletic meets") and a not-yet-reproduced scene C (event of "This year's ball playing on bathing beach") are determined as scenes each having a high priority. On the other hand, a not-yet-reproduced scene B ("This year's march-in at athletic meet") and a not-yet-reproduced scene D ("This year's congestion on bathing beach") are considered as scenes each having a low priority.

As shown in FIG. 4, not only the reproduction modes of the scenes (scene A and scene B), which are directly (in lower level) similar to the scene of "Last year's footrace at athletic meet" and the scene of "Last year's march-in at athletic meet," which are targets to be compared as the viewing history information items, but also the reproduction modes of the scenes such as the scenes C and D, the upper meta-information items of which are similar to the scenes of the viewing history information items while the scenes are not similar to the scenes of the viewing history information items in the lower level, are changed. That is, for example, in a case where in the viewing history information items, there is stored an information item that "scene of foot-race that child X participates has been rewound and replayed twice," in view of this, scenes in which "child X gets physical activity" are determined as scenes in which a user is particularly interested. Thus, for example, a scene in which "child X and his or her father are playing ball" has a higher overall reproduction priority. On the other hand, in a case where in the viewing history information items, there is stored an information item of "scene of march-in has been rewound," in view of this, scenes in which "child X is not included, but the others are included" are determined as scenes in which the user is not interested. Thus, for example, a scene including "beach where a great number of sea-goers exist" has a lower overall reproduction priority.

Referring back to FIG. 3, subsequently, the CPU 1 determines, based on each of the calculated overall reproduction priorities T, the reproduction mode of each of the scenes of the content being the target to be reproduced. First, the CPU 1 determines whether or not a scene being a target to be processed should be reproduced (Step 47). Here, whether or not the scene being the target to be processed should be reproduced depends on whether or not the above-mentioned overall reproduction priority T is significantly low (for example, equal to or smaller than −50). In a case where the overall reproduction priority T of the scene being the target to be processed is significantly low (No at Step 47), reproduction of the scene is skipped (Step 49).

Here, in an early step in which few viewing history information items are accumulated, the denominator in the calculating formula for matching degree as described above is small with a result that the matching degrees are drastically changed. Therefore, in such a step that viewing history information items equal to or larger than a predetermined value are not accumulated, the CPU 1 may correct (adding process) the above-mentioned overall reproduction priority so as to reproduce scenes as much as possible. With this, it is possible to prevent a skip process that a user does not desire from being performed with a result that the user feels uncomfortable.

It is determined that the scene being the target to be processed should be reproduced (Yes at Step 47), the CPU 1 determines, based on the overall reproduction priority T, a reproduction method and an effect of that scene (Step 48). In a case where an image process is necessary for realizing the determined reproduction method and the determined effect (No at Step 50), the CPU 1 performs appropriate image process (Step 51), and reproduces and draws that scene by the determined reproduction method and the determined effect (Step 52).

For example, the CPU 1 performs, with respect to a scene having a significantly high overall reproduction priority T (for example, equal to or larger than 50), for example, a slow motion play, a play in flash mode, a stop motion play. For example, with respect to a scene including a meta-information item of "running" in the element of How, the slow motion play or the play in flash mode is performed, which allows the user to recognize the motion itself and changes of the motion in the scene. Further, with respect to a scene including a meta-information item of "smiling" in the element of How, the stop motion play is performed, which allows the user to view the stabilized good smiling face.

Further, the CPU 1 performs, with respect to a scene having a moderately high overall reproduction priority T (for example, ranging from 25 to 50), the following: for example, reproducing the scene twice, zooming up a subject in the scene, that the user might be interested in, and adding various effects to the scene. For example, with respect to a scene including a meta-information item of "kicking ball" in the element of How, the kick motion is repeatedly reproduced, which gives the impression on the kick motion. In this case, the scene may be reproduced in slow motion when the scene is replayed. Further, with respect to a scene including a meta-information item of "child X" in the element of Who, a zoom-up process is performed on the child X, which allows the child X to be emphasized as the main person in the scene. Further, with respect to a scene including meta-information items of "Baby" and "Pet animal" in the element of Who, lovely image decoration effect is performed, which makes "Baby" and "Pet animal" more cute.

Further, the CPU 1 performs, with respect to a scene having a moderately low overall reproduction priority T (for example, ranging from −50 to −25), for example, fast-rewind and digest play, which enhances a viewing efficiency of the user. The video for digest play may be generated in advance based on the above-mentioned meta-information items.

CONCLUSION

As described above, according to this embodiment, the TV 100 is capable of changing the reproduction mode each of the scenes of the content being the target to be reproduced based on the viewing history information item stored for each of the scenes while the meta-information items are associated with the events. Thus, the TV 100 is capable of performing a reproduction in a mode reflecting a preference of a user for each of the scenes without causing the user to perform cumbersome editing works.

Modification Example

The present invention is not limited to the above-mentioned embodiments of the present invention, and various modifications thereof can be made without departing from the gist of the invention.

Although in each of the above-mentioned embodiments, the reproduction control process is the process for the user of the TV 100, the content in the changed reproduction mode may be provided to a user of a different device. In this case, when the personal reproduction control unit 29 changes the reproduction mode of the content being the target to be reproduced, the personal reproduction control unit 29 generates a control signal for performing that change. Then, for example, when the user provides an instruction that the content is transmitted to the different device, the communication unit 8 or the external interface 19 transmits the generated control signal together with the content. With this, when provides the content to the different user, the user of the TV 100 can cause the user of the different device to view the content in the reproduction mode, which has been changed depending on a preference of the user of the TV 100 for each of the scenes without performing cumbersome editing processes.

Further, in this case, in each of the above-mentioned embodiments, the viewing history management unit 30 may receive viewing history information items of the user of the different device, which are accumulated in the different device, from the different device, and may store the viewing history information items in the personal-viewing-history storing unit 31. Then, the personal reproduction control unit 29 may generate the above-mentioned control signal based on the viewing history information items of the user of the different device. With this, the user of the TV 100 can provide the content, which has been changed depending on a preference of the user of the different device for each of the scenes, to the different device, to thereby cause the user of the different device to view the content, which has been changed depending on the preference of the user of the different device for each of the scenes. That is, the TV 100 is capable of achieving the same effect as that of transmitting the content edit for corresponding to a demand of the user of the different device. In addition, the TV 100 is also capable of receiving a viewing history information item of the content provided to the different device to be reproduced. In this manner, the TV 100 is capable of feeding back the reaction of the user of the different device so as to perform a new change of the reproduction mode, to thereby reflect the new change of the reproduction mode in the same content or a different content, and provide the different user with the content reflecting the new change of the reproduction mode.

Figure 5:
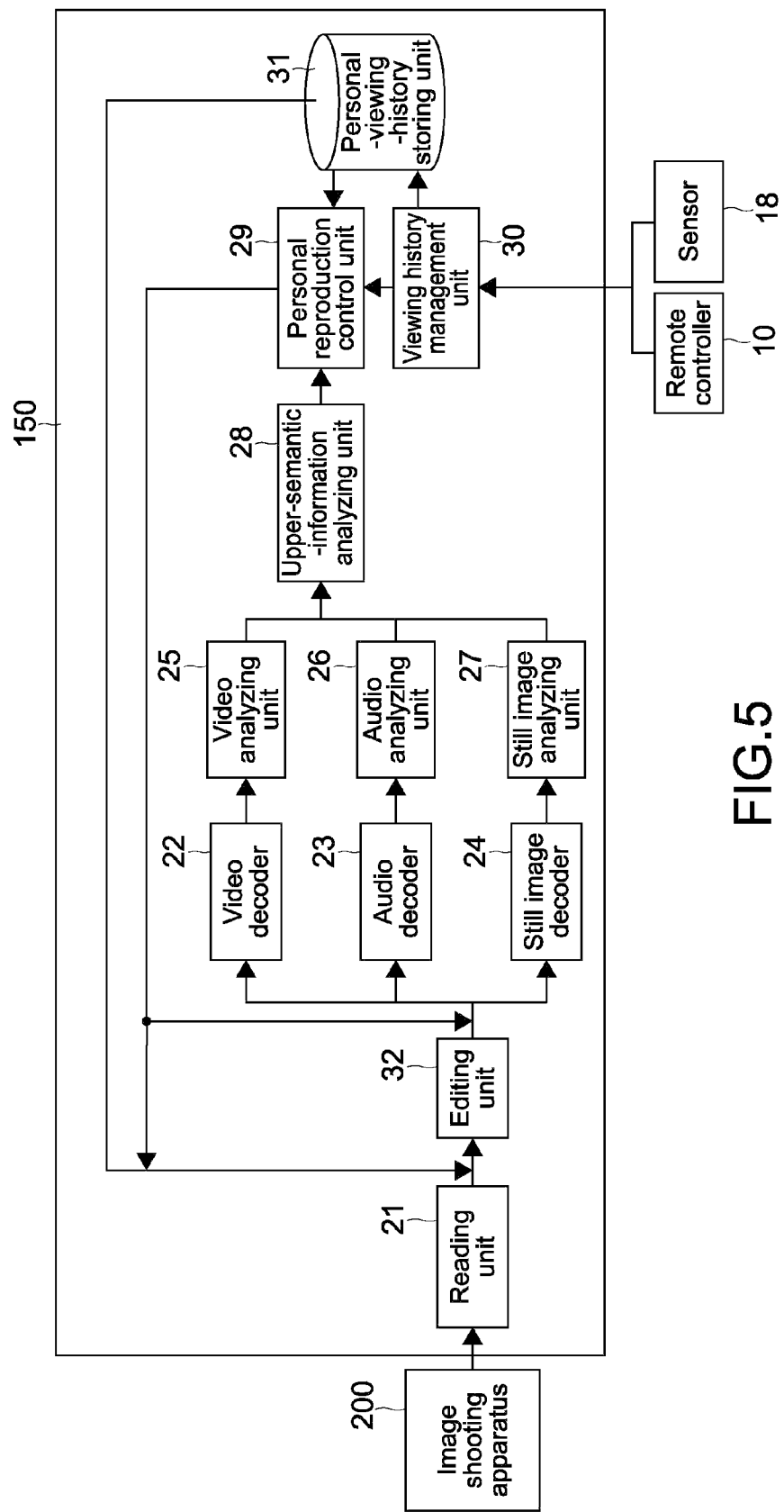
FIG. 5 is a block diagram showing functional blocks included in a reproduction control application in another embodiment of the present invention.

Although in each of the above-mentioned embodiments, the reproduction mode of the content being the target to be reproduced depending on the viewing history information items, it is also possible to edit and update the stored content itself depending on the changes. FIG. 5 is a view showing functional blocks included in the reproduction control application in this case.

As shown in FIG. 5, a TV 150 includes, in addition to the functional blocks as shown in FIG. 2, an editing unit 32. The editing unit 32 edits a content read from the shooting apparatus 200 according to an instruction by a user, for example. Further, the TV 150 is capable of editing the content in such a manner that the content reflects the change of the reproduction mode applied to a content being a target to be reproduced. The editing may be manually performed by the user, or may be automatically by the personal reproduction control unit 29. That is, viewing histories with respect to the content in the changed reproduction mode are accumulated in the personal-viewing-history storing unit 31, and then, in a case where the user selects reflecting the change in editing, the editing unit 32 performs the change. Otherwise, at a time point when the content in the changed reproduction mode is reproduced, the content is automatically edit correspondingly to the change of the reproduction mode through the personal reproduction control unit 29. With this, the content reproduced in the changed reproduction mode will be reproduced under a state in which the content is edit correspondingly to the change from the next time.

Further, the user can transmit the edit content to the user of the different device so that the user of the different device views that content. In this case, the TV 150 may receive a viewing history information item of the user of the different device, to thereby edit the content based on the viewing history information item.

In each of the above-mentioned embodiments, any of the lower meta-information items and the upper meta-information items are extracted by the TV 100. However, at least part of them may be extracted by another device, and may be input together with an image when the image is input into the TV 100. For example, the lower meta-information items of a picture may be extracted by the shooting apparatus 200 such as the digital still camera or the digital video camera when shooting the picture, and may be input into the TV 100 together with the picture, and the TV 100 may extract, from the lower meta-information items, an upper meta-information item. Further, for example, lower meta-information items which can be extracted with a relatively small operation amount, for example, in a case of face detection or night scene detection may be extracted by the shooting apparatus 200, and meta-information items with a relatively large operation amount necessary for extraction, for example, in a case of motion detection or general object recognition may be extracted by the TV 100. In addition, in place of the TV 100, the meta-information items may be extracted by a server on a network, and the extracted meta-information items may be input via the communication unit 8 into the TV 100.

In addition, the processes executed by the TV 100 in each of the above-mentioned embodiments may be executed by any of other electronic apparatuses including a personal computer (PC), a digital still camera, a digital video camera, a cellular phone, a smart phone, a recording/reproducing apparatus, a game machine, personal digital assistants (PDA), an electronic book terminal, an electronic dictionary, a portable AV device, and the like. Further, the digital still camera and the digital video camera may be capable of extracting the lower or upper meta-information items from a video or a still image shot by themselves the digital still camera and the digital video camera. Alternatively, a camera for shooting the video content and the still image content may be provided to an apparatus other than the digital still camera and the digital video camera so that the lower or upper meta-information items can be extracted by the apparatus.

The present application contains subject matter related to that disclosed in Japanese Priority Patent Application JP 2010-084556 filed in the Japan Patent Office on Mar. 31, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
a storage configured to store content including a plurality of scenes, and meta-information items each indicating a feature of at least one of the scenes;
an operation receiver configured to receive an input of an operation; and
a controller configured to control the storage to store an operation-history information item indicating an operation history for a first scene of the scenes while the operation-history information item is associated with the meta-information item of the first scene and to calculate a similarity between the first scene and a second scene based on the meta-information items.

2. The electronic apparatus according to claim 1, wherein the controller is configured to control a reproducer to change a reproduction mode for the second scene based on the operation-history information item and the calculated similarity during reproduction of the second scene.

3. The electronic apparatus according to claim 1, wherein the meta-information items each indicate a feature of each of the plurality of scenes.

4. The electronic apparatus according to claim 1, further comprising:
a sensor configured to detect a viewing-state-history information item indicating a viewing-state-history for the first scene during reproduction of the first scene,
wherein the controller controls the storage to store the viewing-state-history information item together with the operation-history information item while the viewing-state-history information item is associated with the meta-information item of the first scene, and controls a reproducer to change a reproduction mode for the second scene based on the operation-history information item, the viewing-state-history information item, and the calculated similarity during reproduction of the second scene.

5. The electronic apparatus according to claim 4, wherein the controller calculates a preference degree indicating a preference with respect to the first scene based on the operation-history information item and the viewing-state-history information item, calculates a priority of the second scene based on the calculated preference degree and the calculated similarity, and controls the reproducer to preferentially reproduce a scene having a high priority calculated by the controller.

6. The electronic apparatus according to claim 5, wherein the storage stores different kinds of meta-information items for each of the plurality of scenes, and the controller calculates the preference degree for each of the meta-information items of each of the plurality of scenes, and calculates the priority of each of the plurality of scenes by summing up values obtained by multiplying the preference degree by the similarity for each of the plurality of scenes.

7. The electronic apparatus according to claim 4, further comprising:

a communication unit configured to communicate with a different electronic apparatus, wherein the controller generates a control signal for changing the reproduction mode of the second scene, and controls the communication unit to transmit content of the second scene to the different electronic apparatus together with the control signal.

8. The electronic apparatus according to claim 7, wherein the communication unit receives, from the different electronic apparatus, the operation-history information item and the viewing-state-history information item, which are stored in the different electronic apparatus, and the controller generates the control signal based on the received operation-history information item, the received viewing-state-history information item, and the calculated similarity.

9. A reproduction control method, comprising:

storing content including a plurality of scenes, and meta-information items each indicating a feature of at least one of the scenes;

storing an operation-history information item indicating an operation history for a first scene of the scenes while the operation-history information item is associated with the meta-information item of the first scene; and calculating a similarity between the first scene and second scene based on the meta-information items.

10. The reproduction control method according to claim 9 further comprising:

controlling a reproducer to change a reproduction mode for the second scene based on the operation-history information item and the calculated similarity during reproduction of the second scene.

11. The reproduction control method according to claim 9, wherein the meta-information items each indicate a feature of each of the plurality of scenes.

12. A program embedded on a non-transitory computer readable medium to cause an electronic apparatus to execute the steps of:

storing content including a plurality of scenes, and meta-information items each indicating a feature of at least one of the scenes;

storing an operation-history information item indicating an operation history for a first scene of the scenes while the operation-history information item is associated with the meta-information item of the first scene; and calculating a similarity between the first scene and a second scene based on the meta-information items.

* * * * *